US011882567B2

(12) United States Patent
Agiwal et al.

(10) Patent No.: US 11,882,567 B2
(45) Date of Patent: Jan. 23, 2024

(54) METHOD AND APPARATUS FOR COVERING A FIFTH GENERATION (5G) COMMUNICATION SYSTEM FOR SUPPORTING HIGHER DATA RATES BEYOND A FOURTH GENERATION (4G)

(71) Applicant: Samsung Electronics Co., Ltd., Suwon-si (KR)

(72) Inventors: Anil Agiwal, Suwon-si (KR); Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 17/371,480

(22) Filed: Jul. 9, 2021

(65) Prior Publication Data

US 2022/0022247 A1 Jan. 20, 2022

(30) Foreign Application Priority Data

Jul. 15, 2020 (KR) .................. 10-2020-0087541

(51) Int. Cl.
*H04W 72/14* (2009.01)
*H04W 72/23* (2023.01)
*H04W 76/30* (2018.01)
*H04W 56/00* (2009.01)
*H04W 24/08* (2009.01)
*H04W 72/0453* (2023.01)

(52) U.S. Cl.
CPC .......... *H04W 72/23* (2023.01); *H04W 24/08* (2013.01); *H04W 56/001* (2013.01); *H04W 72/0453* (2013.01); *H04W 76/30* (2018.02)

(58) Field of Classification Search
CPC ..... H04W 72/23; H04W 76/30; H04W 24/08; H04W 56/001; H04W 72/0453
See application file for complete search history.

(56) References Cited

U.S. PATENT DOCUMENTS 10,238,312 B2    3/2019   Eom et al.
2015/0164349 A1  6/2015   Gopalakrishnan et al.
(Continued)

FOREIGN PATENT DOCUMENTS

EP         2367292 B1        5/2016
KR    10-2012-0078639 A      7/2012

OTHER PUBLICATIONS

3GPP; TSG RAN; NR; Medium Access Control (MAC) protocol specification (Release 15), 3GPP TS 38.321 V15.7.0, Sep. 27, 2019.
(Continued)

*Primary Examiner* — Mewale A Ambaye
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and apparatus for small data transmission are provided.

20 Claims, 9 Drawing Sheets

(56) References Cited

U.S. PATENT DOCUMENTS

| | | |
|---|---|---|
| 2018/0270791 A1* | 9/2018 | Park .................. H04W 8/24 |
| 2018/0270894 A1* | 9/2018 | Park .................. H04W 76/14 |
| 2019/0053319 A1* | 2/2019 | Jeon .................. H04L 5/0091 |
| 2019/0090806 A1 | 3/2019 | Clavelle et al. |
| 2019/0101870 A1 | 4/2019 | Pandya et al. |
| 2020/0128484 A1 | 4/2020 | Su et al. |
| 2020/0178327 A1 | 6/2020 | Jiang |
| 2020/0187245 A1 | 6/2020 | Fujishiro et al. |
| 2020/0196349 A1* | 6/2020 | He .................. H04W 72/1268 |

OTHER PUBLICATIONS

Asustek, 'Discussion on RACH-less handover mechanism for NR', R2-1901041, 3GPP TSG-RAN WG2 Meeting #105, Athens, Greece, Feb. 14, 2019.

International Search Report and Written Opinion dated Oct. 13, 2021, issued in International Application No. PCT/KR2021/008820.

International Search Report dated Oct. 13, 2021, issued in International Application No. PCT/KR2021/008500.

Huawei et al., Configured grant configurations for SUL serving cell, R2-2000429, 3GPP TSG-RAN WG2 Meeting #109 electronic, Feb. 14, 2020.

Extended European Search Report dated Oct. 17, 2023, issued in European Patent Application No. 21842306.9.

* cited by examiner

METHOD AND APPARATUS FOR COVERING A FIFTH GENERATION (5G) COMMUNICATION SYSTEM FOR SUPPORTING HIGHER DATA RATES BEYOND A FOURTH GENERATION (4G)

CROSS-REFERENCE TO RELATED APPLICATION(S)

This application is based on and claims priority under 35 U.S.C. § 119(a) of a Korean patent application number 10-2020-0087541, filed on Jul. 15, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method and a system for small data transmission in wireless communication system.

2. Description of Related Art

To meet the demand for wireless data traffic having increased since deployment of fourth generation (4G) communication systems, efforts have been made to develop an improved fifth generation (5G) or pre-5G communication system. The 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on small data transmission (SD) in 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, a radio resource control (RRC) release message including at least one configured grant uplink resource for a small data transmission (SDT), identifying an uplink carrier among a normal uplink (NUL) or a supplementary uplink (SUL), based on an SDT procedure initiated while the terminal is in an RRC inactive state, identifying a synchronization signal block (SSB) among SSBs associated with configured grant uplink resources for the SDT procedure on the identified uplink carrier, and transmitting, to the base station, uplink data in an uplink grant corresponding to the identified SSB.

In accordance with another aspect of the disclosure, a method performed by a base station is provided. The method includes transmitting, to a terminal, a radio resource control (RRC) release message including at least one configured grant uplink resource for a small data transmission (SDT), and receiving, from the terminal, uplink data in an uplink grant corresponding to a synchronization signal block (SSB), based on an SDT procedure initiated while the terminal is in an RRC inactive state, wherein the SSB is one among a plurality of SSBs associated with configured grant uplink resources for the SDT procedure on an uplink carrier, and wherein the uplink carrier is one among a normal uplink (NUL) or a supplementary uplink (SUL).

In accordance with another aspect of the disclosure, a terminal is provided. The terminal includes a transceiver, and at least one processor configured to receive, from a base station via the transceiver, a radio resource control (RRC) release message including at least one configured grant uplink resource for a small data transmission (SDT), identify an uplink carrier among a normal uplink (NUL) or a supplementary uplink (SUL), based on an SDT procedure initiated while the terminal is in an RRC inactive state, identify a synchronization signal block (SSB) among SSBs associated with configured grant uplink resources for the SDT procedure on the identified uplink carrier, and transmit, to the base station via the transceiver, uplink data in an uplink grant corresponding to the identified SSB.

In accordance with another aspect of the disclosure, a base station is provided. The base station includes a transceiver, and at least one processor configured to transmit, to a terminal via the transceiver, a radio resource control (RRC) release message including at least one configured grant uplink resource for a small data transmission (SDT), and receive, from the terminal via the transceiver, uplink data in an uplink grant corresponding to a synchronization signal block (SSB), based on an SDT procedure initiated while the terminal is in an RRC inactive state, wherein the SSB is one among a plurality of SSBs associated with configured grant uplink resources for the SDT procedure on an uplink carrier, and wherein the uplink carrier is one among a normal uplink (NUL) or a supplementary uplink (SUL).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
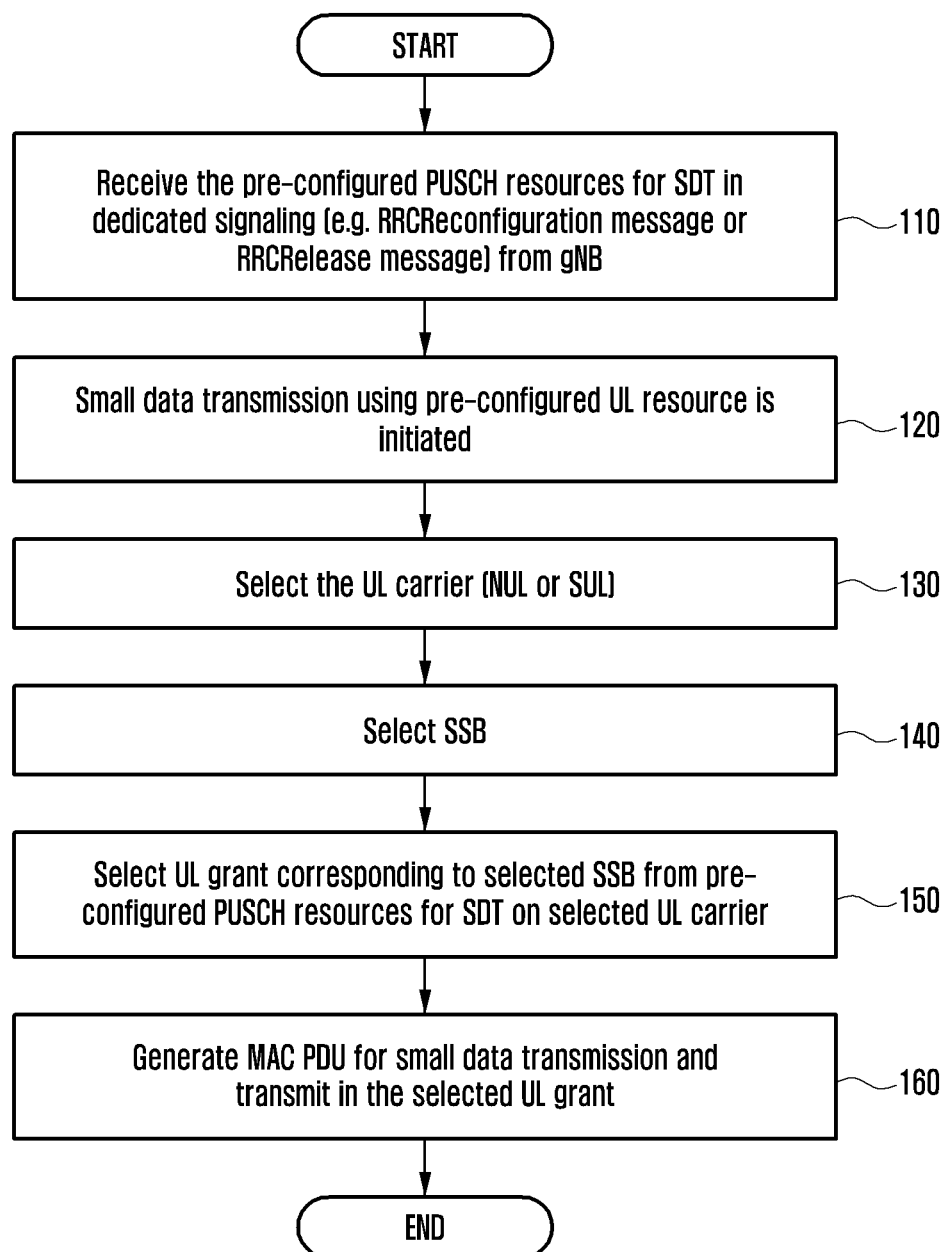
FIG. 1 illustrates an example of small data transmission using pre-configured uplink grant according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The base station (BS) is an entity communicating with a user equipment (UE) and may be referred to as BS, base transceiver station (BTS), node B (NB), evolved NB (eNB), access point (AP), 5G NB (5GNB), or next generation node B (gNB).

The UE is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So a fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive Multiple-Input Multiple-Output (MIMO), Full Dimensional MIMO (FD-MIMO), array antenna, an analog beam forming, and large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of RX beam patterns of different directions. Each of these receive patterns can be also referred as RX beam.

The fifth generation wireless communication system (also referred as next generation radio or NR), supports stand-alone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UMTS) Terrestrial Radio Access) (i.e., if the node is an ng-eNB) or NR access (i.e., if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising the Primary Cell (PCell) and optionally one or more Secondary Cells (SCells). In NR the term Secondary Cell Group (SCG) refers to a group of serving cells associated with the Secondary Node, comprising the Primary SCG Cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system (or NR), Physical Downlink Control Channel (PDCCH) is used to schedule downlink (DL) transmissions on Physical Downlink Shared Channel (PDSCH) and uplink (UL) transmissions on Physical Uplink Shared Channel (PUSCH). The Downlink Control Information (DCI) on PDCCH includes: Downlink assignments containing at least modulation and coding format, resource allocation, and hybrid automatic repeat request (HARQ) information related to downlink shared channel (DL-SCH); and Uplink scheduling grants containing at least modulation and coding format, resource allocation, and hybrid-ARQ information related to uplink shared channel (UL-SCH). In addition to scheduling, PDCCH can be used to activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for Physical Uplink Control Channel (PUCCH) and PUSCH; transmission of one or more TPC commands for sounding reference signal (SRS) transmissions by one or more UEs; switching a UE's active bandwidth part; and initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In NR, a list of search space configurations are signaled by gNB for each configured bandwidth part (BWP) wherein each search configuration is uniquely identified by an identifier. Identifiers of search space configuration to be used for a specific purpose such as paging reception, system information (SI) reception, random access response (RAR) reception is explicitly signaled by gNB. In NR search space configuration comprises parameters Monitoring-periodicity-PDCCH-slot, Monitoring-offset-PDCCH-slot, Monitoring-symbols-PDCCH-within-slot, and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \bmod (\text{Monitoring-periodicity-PDCCH-slot})=0;$$ Equation 1

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) identifier (ID) (SSB or channel state information reference signal (CSI-RS)) is configured per TCI state. The list of TCI states corresponding to a CORESET configuration is signaled by gNB via RRC signaling. One of the TCI states in the TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP).

BA is achieved by configuring RRC connected UE with BWP(s) and telling the UE which of the configured BWPs is currently the active one. When BA is configured, the UE only has to monitor PDCCH on the one active BWP (i.e., the UE does not have to monitor PDCCH on the entire DL frequency of the serving cell). In RRC connected state, the UE is configured with one or more DL and UL BWPs, for each configured Serving Cell (i.e. PCell or SCell). For an activated Serving Cell, one UL and DL BWP is always active at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, the UE first transmits Random Access preamble (also referred as Msg1) and then waits for Random access response (RAR) in the RAR window. RAR is also referred as Msg2. The next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+ 14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; $0 \leq s\_id \leq 14$; t_id is the index of the first slot of the PRACH occasion ($0 \leq t\_id < 80$); fid is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by the gNB can be multiplexed in the same RAR MAC protocol data unit (PDU) by the gNB. An RAR in a MAC PDU corresponds to the UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable number of times (configured by the gNB in RACH configuration), the UE goes back to first step (i.e., select random access resource (preamble/RACH occasion)) and transmits the RA preamble. A backoff may be applied before going back to the first step.

If the RAR corresponding to its RA preamble transmission is received, the UE transmits a message 3 (Msg3) in UL grant received in RAR. The Msg3 includes messages such as RRC connection request, RRC connection re-establishment request, RRC handover confirm, scheduling request, SI request etc. The Msg3 may also include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a PDCCH addressed to C-RNTI included in Msg3, contention resolution is considered successful, the contention resolution timer is stopped, and the RA procedure is completed. While the contention resolution timer is running, if the UE receives a contention resolution MAC control element (CE) including the UE's contention resolution identity (first X bits of common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, UE goes back to the first step (i.e., select random access resource (preamble/RACH occasion)), and transmits the RA preamble. A backoff may be applied before going back to first step.

Contention free random access (CFRA): This is also referred as legacy CFRA or 4 step CFRA. The CFRA procedure is used for scenarios such as handover where low latency is required, timing advance establishment for SCell, etc. The evolved node B (eNB) assigns a dedicated Random access preamble to the UE. UE transmits the dedicated RA preamble. The eNB transmits the RAR on PDSCH addressed to RA-RNTI. The RAR conveys RA preamble identifier and timing alignment information. The RAR may also include UL grant. The RAR is transmitted in RAR window similar to CBRA procedure. CFRA is considered successfully completed after receiving the RAR including RAPID of the RA preamble transmitted by the UE. In case RA is initiated for beam failure recovery, CFRA is considered successfully completed if a PDCCH addressed to C-RNTI is received in a search space for beam failure recovery. If the RAR window expires, and RA is not successfully completed and the UE has not yet transmitted the RA preamble for a configurable number of times (configured by gNB in RACH configuration), the UE retransmits the RA preamble.

For certain events such has handover and beam failure recovery if dedicated preamble(s) are assigned to UE, during first step of random access (i.e., during random access resource selection for Msg1 transmission), the UE determines whether to transmit dedicated preamble or non-dedicated preamble. Dedicated preambles are typically provided for a subset of SSBs/CSI-RSs. If there is no SSB/CSI-RS having a DL reference signal received power (RSRP) above a threshold among the SSBs/CSI-RSs for which contention free random access resources (i.e. dedicated preambles/ROs) are provided by the gNB, the UE selects a non-dedicated preamble. Otherwise, the UE selects a dedicated preamble. So during the RA procedure, one random access attempt can be CFRA while other random access attempts can be CBRA.

2 step contention based random access (2 step CBRA): In the first step, UE transmits a random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If a CCCH SDU was transmitted in MsgA payload, the UE performs contention resolution using the contention resolution information in MsgB. The contention resolution is successful if the contention resolution identity received in MsgB matches the first 48 bits of the CCCH SDU transmitted in MsgA. If C-RNTI was transmitted in MsgA payload, the contention resolution is successful if the UE receives PDCCH addressed to C-RNTI. If contention resolution is successful, the random access procedure is considered successfully completed. Instead of contention resolution information corresponding to the transmitted MsgA, MsgB may include fallback information corresponding to the random access preamble transmitted in MsgA. If the fallback information is received, UE transmits Msg3 and performs contention resolution using Msg4 as in CBRA procedure. If contention resolution is successful, the random access procedure is considered successfully completed. If contention resolution fails upon fallback (i.e. upon transmitting Msg3), the UE retransmits MsgA. If a configured window in which the UE monitors network response after transmitting MsgA expires and the UE has not received MsgB including contention resolution information or fallback information as explained above, the UE retransmits MsgA. If the random access procedure is not successfully completed even after transmitting the MsgA configurable number of times, UE fallbacks to 4 step RACH procedure i.e. UE only transmits the PRACH preamble.

MsgA payload may include one or more of a CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. The MsgA may include a UE ID (e.g. random ID, S-TMSI, C-RNTI, resume ID, etc.) along with the preamble in the first step. The UE ID may be included in the MAC PDU of the MsgA. A UE ID such as C-RNTI may be carried in the MAC CE, wherein the MAC CE is included in MAC PDU. Other UE IDs (such as random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When the UE performs RA after power on (before it is attached to the network), then the UE ID is the random ID. When the UE performs RA in IDLE state after the UE is attached to network, then the UE ID is S-TMSI. If UE has an assigned C-RNTI (e.g. in connected state), the UE ID is C-RNTI. In case the UE is in INACTIVE state, the UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case, the gNB assigns dedicated Random access preamble(s) and PUSCH resource(s) to the UE for MsgA transmission. RO(s) to be used for preamble transmission may also be indicated. In the first step, the UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If the UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to UE, during the first step of random access (i.e., during random access resource selection for MsgA transmission), the UE determines whether to transmit a dedicated preamble or a non-dedicated preamble. Dedicated preambles are typically provided for a subset of SSBs/CSI-RSs. If there is no SSB/CSI-RS having DL RSRP above a threshold amongst the SSBs/CSI-RSs for which contention free random access resources (i.e., dedicated preambles/ROs/PUSCH resources) are provided by the gNB, the UE selects a non dedicated preamble. Otherwise UE select dedicated preamble. So during the RA procedure, one random access attempt can be 2 step CFRA while other random access attempt can be 2 step CBRA.

Upon initiation of random access procedure, the UE first selects the carrier (SUL or NUL). If the carrier to use for the Random Access procedure is explicitly signaled by the gNB, the UE selects the signaled carrier for performing Random Access procedure. If the carrier to use for the Random Access procedure is not explicitly signaled by gNB, if the Serving Cell for the Random Access procedure is configured with supplementary uplink, and if the RSRP of the downlink pathloss reference is less than rsrp-ThresholdSSB-SUL, then the UE selects the SUL carrier for performing Random Access procedure. Otherwise, the UE selects the NUL carrier for performing Random Access procedure. Upon selecting the UL carrier, the UE determines the UL and DL BWP for random access procedure as specified in section 5.15 of TS 38.321. The UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, then the UE selects 2 step RACH.

else if 4 step contention free random access resources are signaled by gNB for this random access procedure, then the UE selects 4 step RACH.

else if the UL BWP selected for this random access procedure is configured with only 2 step RACH resources, then the UE selects 2 step RACH.

else if the UL BWP selected for this random access procedure is configured with only 4 step RACH resources, then the UE selects 4 step RACH.

else if the UL BWP selected for this random access procedure is configured with both 2 step and 4 step RACH resources, if RSRP of the downlink pathloss reference is below a configured threshold, then the UE selects 4 step RACH. Otherwise UE selects 2 step RACH.

In the fifth generation wireless communication system, node B (gNB) or base station in cell broadcast Synchronization Signal and PBCH block (SSB) consists of primary synchronization signal (PSS) and secondary synchronization signal (SSS) and system information. System information (SI) includes common parameters needed to communicate in cell. In the fifth generation wireless communication system (also referred as next generation radio or NR), SI is divided into the master information block (MIB) and a number of system information blocks (SIBs) where:

the MIB is always transmitted on the BCH with a periodicity of 80 ms and repetitions made within 80 ms and includes parameters that are needed to acquire system information block 1 (SIB1) from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. Within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous (DRX) may be configured by upper layers. The UE monitors Short Messages transmitted with paging RNTI (P-RNTI) over DCI; monitors a Paging channel for CN paging using 5G-S-temporary mobile subscriber identity (5G-S-TMSI); performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer, the UE stores the UE Inactive AS context, and a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and can send SI request (if configured); and performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; and acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN based notification area (RNA) update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) (DRB(s)). In response to a request to resume the RRC connection, the network may resume the suspended RRC connection and send the UE to RRC_CONNECTED, or reject the request to resume and send the UE to RRC_INACTIVE (with a wait timer), or directly re-suspend the RRC connection and send the UE to RRC_INACTIVE, or directly release the RRC connection and send the UE to RRC_IDLE, or instruct the UE to initiate NAS level recovery (in this case the network sends an RRC setup message).

Upon initiating the resume procedure, the UE:
 applies the default L1 parameter values as specified in corresponding physical layer specifications, except for the parameters for which values are provided in SIB1;
 applies the default MAC Cell Group configuration
 applies the CCCH configuration
 starts the timer T319;
 applies the timeAlignmentTimerCommon included in SIB1
 applies the default SRB1 configuration
 sets the variable pendingRNA-Update to false;
 initiates transmission of the RRCResumeRequest message or RRCResumeRequest1

-continued restores the RRC configuration, RoHC state, the stored QoS flow to DRB mapping rules and the KgNB and $K_{RRCint}$ keys from the stored UE Inactive AS context except for the following:
    masterCellGroup;
    mrdc-SecondaryCellGroup, if stored; and
    pdcp-Config;
sets the resumeMAC-I to the 16 least significant bits of the MAC-I calculated:
    over the ASN.1 encoded as per clause 8 (i.e., a multiple of 8 bits) VarResumeMAC-Input;
  with the $K_{RRCint}$ key in the UE Inactive AS Context and the previously configured integrity protection algorithm; and
    with all input bits for COUNT, BEARER and DIRECTION set to binary ones;
derives the KgNB key based on the current KgNB key or the NH, using the stored nextHopChainingCount value;
derives the $K_{RRCenc}$ key, the $K_{RRCint}$ key, the $K_{UPint}$ key and the $K_{UPenc}$ key;
configures lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE;
configures lower layers to apply ciphering for all signaling radio bearers except SRB0 and to apply the configured ciphering algorithm, the $K_{RRCenc}$ key and the $K_{UPenc}$ key derived, i.e. the ciphering configuration shall be applied to all subsequent messages received and sent by the UE;
    re-establishes PDCP entities for SRB1;
    resumes SRB1; and
    transmits RRCResumeRequest or RRCResumeRequest1.

In the 4G wireless communication system, for small data transmission in RRC_IDLE, the UE can be configured with preconfigured UL resources. The UE receives PUSCH resources (e.g., periodic UL grants) for small data transmission in RRC connection release message. If the UE has a small amount of data to transmit in RRC_IDLE, the UE is camped in the same cell from which the UE has received UL grants in the RRC connection release message, and the UE has a valid TA, then the UE selects the earliest UL grant and transmits the MAC PDU in the selected UL grant. The UE waits for response from the network within a configured time interval. For the response, the UE monitors PDCCH addressed to an RNTI assigned to UE in RRC connection release message. If the response is not received, small data transmission is considered to have failed.

5G wireless communication system supports multiple beams, multiple UL carriers, multiple BWPs and search spaces for PDCCH monitoring. Not all these aspects are considered in the existing procedure. The small data transmission procedure should be enhanced to support multiple beams, multiple UL carriers, multiple BWPs and search spaces for PDCCH monitoring.

In the 5G wireless communication system, logical channel prioritization (LCP) procedure is used to generate MAC PDU. RRC controls the LCP procedure by configuring mapping restrictions for each logical channel:
  allowedSCS-List, which sets the allowed Subcarrier Spacing(s) for transmission;
  maxPUSCH-Duration, which sets the maximum PUSCH duration allowed for transmission;
  configuredGrantType1Allowed, which sets whether a configured grant Type 1 can be used for transmission;
  allowedServingCells, which sets the allowed cell(s) for transmission;
  allowedCG-List, which sets the allowed configured grant(s) for transmission;
  allowedPHY-PriorityIndex, which sets the allowed PHY priority index(es) of a dynamic grant for transmission.

For SDT, DRBs are resumed upon initiation of RRC connection resumption. The issue is whether the LCH restrictions in the stored AS-context are applied during MAC PDU generation for small data transmission or not.

Embodiment 1—Operation Upon Initiating Resumption of RRC Connection for Small Data Transmission in RRC_INACTIVE or Operation Upon Initiating Small Data Transmission Procedure in RRC_INACTIVE The UE is in RRC_INACTIVE state. During the RRC_INACTIVE state, the UE initiates RRC connection resumption for small data transmission (if criteria to perform small data transmission is met). The RRC connection resumption for small data transmission may also be referred as small data transmission procedure. Upon initiation of RRC connection resumption for small data transmission or upon initiation of small data transmission procedure, the UE performs the following operations:

apply the default L1 parameter values as specified in corresponding physical layer specifications, except for the parameters for which values are provided in SIB1;
  apply the default MAC Cell Group configuration
  apply the CCCH configuration
  start timer (T319 or a new timer configured by gNB for small data transmission);
  apply the timeAlignmentTimerCommon included in SIB1
  apply the default SRB1 configuration
  set the variable pendingRNA-Update to false;
  initiate transmission of the RRCResumeRequest message or RRCResumeRequest1
  if field useFullResumeID is signalled in SIB1:
    select RRCResumeRequest1 as the message to use;
    set the resumeIdentity to the stored fullI-RNTI value;
  else:
    select RRCResumeRequest as the message to use;
    set the resumeIdentity to the stored shortI-RNTI value;
  restore the RRC configuration, RoHC state, the stored QoS flow to DRB mapping rules and the KgNB and $K_{RRCint}$ keys from the stored UE Inactive AS context except for the following:
    masterCellGroup;
    mrdc-SecondaryCellGroup, if stored; and
    pdcp-Config;
  set the resumeMAC-I to the 16 least significant bits of the MAC-I calculated:
    over the ASN.1 encoded VarResumeMAC-Input
    with the $K_{RRCint}$ key in the UE Inactive AS Context and the previously configured integrity protection algorithm; and
    with all input bits for COUNT, BEARER and DIRECTION set to binary ones;
  derive the KgNB key based on the current KgNB key or the NH, using the stored nextHopChainingCount value;
  derive the $K_{RRCenc}$ key, the $K_{RRCint}$ key, the $K_{UPint}$ key and the $K_{UPenc}$ key;
  configure lower layers to apply integrity protection for all radio bearers except SRB0 using the configured algorithm and the $K_{RRCint}$ key and $K_{UPint}$ key, i.e., integrity protection shall be applied to all subsequent messages and user data received and sent by the UE; only DRBs with previously configured UP integrity protection shall resume integrity protection.

configure lower layers to apply ciphering for all radio bearers except SRB0 and to apply the configured ciphering algorithm, the $K_{RRCenc}$ key and the $K_{UPenc}$ key derived, i.e. the ciphering configuration shall be applied to all subsequent messages and data received and sent by the UE;
re-establish PDCP entities for all SRBs and all DRBs (or re-establish PDCP entities for SRB1 and all DRBs); Note that UE applies the PDCP configuration from stored AS context for the re-established PDCP entities of DRBs and SRB2. In an embodiment, whether to apply PDCP configuration from stored AS context or apply default PDCP configuration may be indicated by gNB in RRCRelease message or RRCReconfiguration message and UE applies PDCP configuration from stored AS context or apply default PDCP configuration accordingly for the re-established PDCP entities of DRBs and SRB2.

re-establish RLC entities for DRBs (note that RLC entities for SRB1 is re-established when UE enters inactive state). Note that the UE applies the RLC configuration from a stored AS context for the re-established RLC entities of DRBs and SRB2. In an embodiment, whether to apply RLC configuration from the stored AS context or to apply a default RLC configuration can be indicated by the gNB in the RRCRelease message or the RRCReconfiguration message, and the UE applies the RLC configuration from the stored AS context or applies the default RLC configuration accordingly for the re-established RLC entities of DRBs and SRB2.

resume all SRBs and all DRBs (or resume SRB1 and all DRBs);

Upon connection resume, at which point of time will PDCP provide DTCH SDU to the lower layer, also needs to be specified. RRC can indicate this to PDCP upon resumption of DRBs.

transmit RRCResumeRequest or RRCResumeRequest1. The user data are ciphered and integrity protected (only for DRBs configured with UP integrity protection) and transmitted on DTCH multiplexed with the RRCResumeRequest/RRCResumeRequest1 message on CCCH. Some assistance information may also be included like BSR (regular or truncated); a New MAC CE indicating UE has more UL data or UE expects DL data in response to UL Data and/or including SS-RSRP or CQI; or an indication in the RRC message indicating that the UE has more UL data or that the UE expects DL data in response to UL Data. Note that this transmission is performed in Msg3 or MsgA in case of RACH based small data transmission and in preconfigured UL grant in case of non RACH based small data transmission.

In an alternate embodiment, instead of sending RRCResumeRequest or RRCResumeRequest1 together with uplink data, uplink data with integrity protection is transmitted. RRCResumeRequest or RRCResumeRequest1 message is not transmitted. The gNB may authenticate UE based on received MAC-I together with uplink data. Note that this transmission is performed in Msg3 or MsgA in case of RACH based small data transmission and in preconfigured UL grant in case of non RACH based small data transmission.

Instead of resuming all DRBs and re-establishing PDCP/RLC entities for all DRBs in the above operation, the UE resumes and re-establishes only those DRBs for which small data transmission is allowed.

The DRBs for which small data transmission is allowed can be signaled by the gNB (e.g., in an RRCRelease message or any other RRC signaling message). One or more DRB identities of DRBs for which small data transmission is allowed may be included in RRCRelease message or any other RRC signaling message, such as an RRCReconfiguration message. Alternately, an indicator (e.g., SDTAllowed set to TRUE) may be included in a configuration of DRB which indicates that SDT is allowed for that DRB. If SDTAllowed is set to FALSE or is not included, UE assumes that SDT is not allowed for that DRB.

In an embodiment, a DRB is considered as allowed for small data transmission if data from LCH of this DRB is allowed to be transmitted according to LCH restrictions (allowedSCS-List, maxPUSCH-Duration, configuredGrantType1Allowed, allowedServingCells, allowedCG-List and allowedPHY-PriorityIndex) in the UL grant for small data transmission. One or more LCH restrictions are configured in LCH configuration of LCH associated with DRB. allowedSCS-List sets the allowed Subcarrier Spacing(s) for transmission, including maxPUSCH-Duration, which sets the maximum PUSCH duration allowed for transmission; configuredGrantType1Allowed, which sets whether a configured grant Type 1 can be used for transmission; allowedServingCells, which sets the allowed cell(s) for transmission; allowedCG-List, which sets the allowed configured grant(s) for transmission; and allowedPHY-PriorityIndex, which sets the allowed PHY priority index(es) of a dynamic grant for transmission. For example, if SCS for UL grant for small data transmission is SCS X and LCH for a DRB is configured with allowedSCS-List wherein SCS X is not included in allowedSCS-List, the DRB is not considered for small data transmission.

Embodiment 2—Small Data Transmission Using Preconfigured UL Grant

FIG. 1 illustrates an example of small data transmission using pre-configured uplink grant (can also be referred as CG type 1 PUSCH resources) according to an embodiment of the disclosure.

Referring to FIG. 1, in RRC_CONNECTED UE reports its capabilities to indicate whether to support pre-configured PUSCH during RRC_INACTIVE. UE may report its preference to configure the pre-configured PUSCH e.g. in UEAssistanceInformation message. The gNB decides to configure pre-configured PUSCH in RRC_INACTIVE based on: UE capabilities, UE types, UE preference and UL traffic pattern.

The UE receives the pre-configured PUSCH resources (e.g. CG Type 1 resources) for small data transmission (SDT) in dedicated signaling (RRCReconfiguration message or RRCRelease message) from gNB at operation 110.

In an embodiment, these PUSCH resources for SDT are applicable to cell from which UE has received the RRCRelease message or RRCReconfiguration message including PUSCH resources for SDT. In an embodiment, these resources for SDT are applicable to multiple cells. The details of association between UL resources for SDT and cell(s) is described later.

These PUSCH resources are also mapped to SSB(s). The mapping rule between PUSCH resources and SSBs is described later.

If multiple UL carriers are supported, pre-configured PUSCH resources for SDT are received separately for SUL and NUL The configuration on pre-configured PUSCH is provided in RRCRelease. For instance, the configuration can be added when RRCRelease is used to switch to RRC_INACTIVE. The configuration may be added into SuspendConfig IE. Alternatively, the ConfiguredGrantConfig on Type 1 is provided in RRCReconfiguration. And, an indicator is included into RRCRelease to indicate if UE can continue to use the configured grant type 1 during RRC_INACTIVE. In addition, additional (Pre-configured PUSCH specific) configuration may be provided in RRCRelease.

While the UE is in RRC_INACTIVE, SDT using pre-configured PUSCH resources is initiated at operation 120. Criteria for SDT using pre-configured PUSCH resources is described later.

The UE selects UL carrier at operation 130.

If SUL is configured (in the cell where UE is performing SDT i.e. camped cell in RRC_INACTIVE) and the RSRP of the downlink pathloss reference (e.g., SSB) is less than RSRPThresholdSUL-SDT, the UE selects SUL. Otherwise, the UE selects NUL. RSRPThresholdSUL-SDT is received from gNB. If RSRPThresholdSUL-SDT is not configured, the UE uses RSRPThresholdSUL configured in RACH configuration. Note that RSRPThresholdSUL-SDT is a new parameter configured for selecting between SUL and NUL for small data transmission. This parameter is different from SUL and NUL carrier selection for random access preamble transmission. The reason is that UL information transmitted in case of SDT is much larger than in case of normal random access procedure for connection setup/resume and requires a much robust channel condition to ensure reliable transmission.

The UE then selects an SSB with SS-RSRP above the RSRPThresholdSSB-SDT among the SSBs associated with pre-configured PUSCH resources for SDT on selected UL carrier at operation 140. RSRPThresholdSSB-SDT is received from the gNB. If RSRPThresholdSSB-SDT is not configured, UE uses RSRPThresholdSSB configured in RACH configuration. Note that on the selected UL carrier, UE uses the pre-configured PUSCH resources for SDT on an UL BWP for small data transmission using pre-configured PUSCH resources. The UL BWP for small data transmission using pre-configured PUSCH resources is described later.

The UE selects the earliest available UL grant corresponding to selected SSB from the pre-configured PUSCH resources of selected UL carrier at operation 150.

The UE generates MAC PDU for small data transmission and transmit in the selected UL grant at operation 160. The UE transmits the small data by using one of the following options:
  RRCResumeRequest (or new RRC message)+uplink data (on DTCH). resumeIdentity, ResumeMAC-I, resumeCause in RRCResumeRequest/RRCResumeRequest1. New resumeCause can be introduced to indicate the small data transmission or small data transmission via pre-configured PUSCH.
  RRCResumeRequest (or new RRC message). resumeIdentity, ResumeMAC-I, resumeCause, NAS container in RRCResumeRequest/RRCResumeRequest1. NAS container includes UL data.
  new MAC CE (resumeIdentity, ResumeMAC-I)+uplink data (on DTCH). resumeIdentity is provided for UE identification purpose. ResumeMAC-I is for security.

Embodiment 2-1—Details of Pre-Configured PUSCH Resources for SDT

Associated Cell(s)

In an embodiment, pre-configured PUSCH resource configuration for SDT received in dedicated signaling are valid in the cell from which UE has received the configuration.

In an embodiment, gNB can also signal preconfigured PUSCH resources for SDT for multiple cells in dedicated signalling.
  Signalling can include preconfigured PUSCH resources configuration (s) and associated one or more cell identities.
  One configuration can be mapped to multiple cells.
  Cell identity may be skipped for configuration associated with cell from which RRCRelease message is received.

Associated BWP(s)

In an embodiment, pre-configured PUSCH resource configuration for SDT received in dedicated signaling are applied to initial UL BWP (or pre-configured PUSCH resource configuration for SDT are for the initial UL BWP or pre-configured PUSCH resource configuration for SDT are signaled for initial UL BWP).

In an alternate embodiment, applicable BWP (among one of configured BWPs in RRCReconfiguration message, BWP ID can be indicated) for SDT using pre-configured PUSCH resource configuration can be informed in RRC message (e.g., RRCRelease, RRCReconfiguration message or SI message). In an embodiment, BWP configuration may include an indicator indicating that the BWP is applied for SDT using pre-configured PUSCH resource configuration. In an embodiment, BWP for SDT using pre-configured PUSCH resource configuration is the BWP whose configuration include pre-configured PUSCH resource configuration for SDT. If applicable BWP is not informed, pre-configured PUSCH resource configuration for SDT received in dedicated signaling are applied to initial UL BWP.

Alternately, absolute value based frequency domain info can be signaled.

Associated UL Carrier(s)

In an embodiment, preconfigured PUSCH resources for SDT are separately configured for NUL and SUL.

In order to optimize the signalling, if configuration is same for both SUL and NUL, the configuration for SUL can be skipped and UE applies the NUL configuration to SUL as well if SUL is configured in the cell.

Associated Between SSBs and UL Grants

In case of system deployed at higher frequencies, the UE needs to know the association between SSBs and configured grants (i.e., PUSCH occasions/resources) configured.

In the RRC_INACTIVE state, the UE can only measure the SSBs, so the configured grants configured are associated with SSBs.

Figure 2:
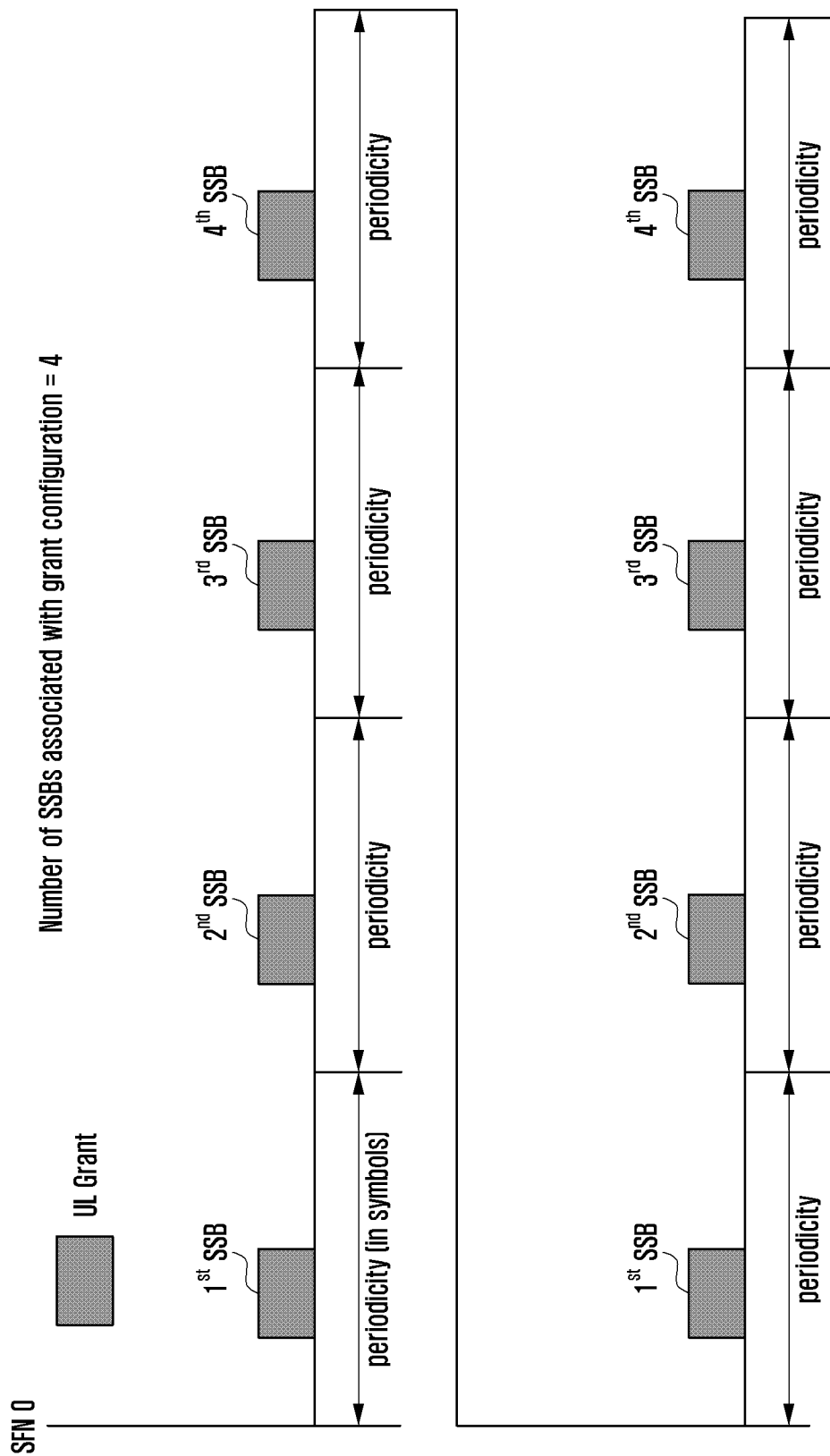
FIG. 2 illustrates an example of association between synchronization signal block and uplink grant according to an embodiment of the disclosure.

The following options are proposed in this disclosure for associating grants with SSBs:
  Option 1: Signaling includes one configured grant configuration for an UL carrier for SDT
    1-1: list of one or more SSB Ids associated with a grant configuration (or PUSCH resource configuration) is signaled.
    1-2: grant configuration is associated with all transmitted SSBs in the cell where transmitted SSBs are determined by parameter ssb-PositionsInBurst.
  In an embodiment, a UL grant is associated with ith SSB if i=[floor(CURRENT_symbol/periodicity)] modulo N1, where
    CURRENT_symbol=[SFN×numberOfSlotsPerFrame×numberOfSymbolsPerSlot+slot number in the frame×numberOfSymbolsPerSlot+symbol number in the slot]
    numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS. SCS is the SCS of UL BWP associated with configured grant.

periodicity (in symbols) is the periodicity at which UL grants are configured and is signaled SFN is the system frame number in which configured UL grant is allocated slot number is the starting slot of configured UL grant symbol number is the starting symbol of configured UL grant N1=Number of SSBs SSBs are mapped in ascending order of their SSB IDs FIG. 2 illustrates an example of association between synchronization signal block and uplink grant (PUSCH occasion/resource) according to an embodiment of the disclosure.

Referring to FIG. 2, UL grant/PUSCH occasion is associated with one SSB. The period over which each SSB is mapped to a UL grant/PUSCH occasion can be referred as association period where association period is multiple of configured grant periodicity. In FIG. 2, association period includes 4 periods configured grant. It is to be noted that each UL grant/PUSCH occasion can be mapped to one or more SSBs. In FIG. 2, each UL grant/PUSCH occasion is mapped to one SSB.

Option 2: Signaling includes multiple grant configurations for an UL carrier

In this option, list of one or more SSB IDs associated with a grant configuration is signaled in corresponding configuration. Each UL grant in grant configuration is associated with SSB(s) in the list.

Figure 3:
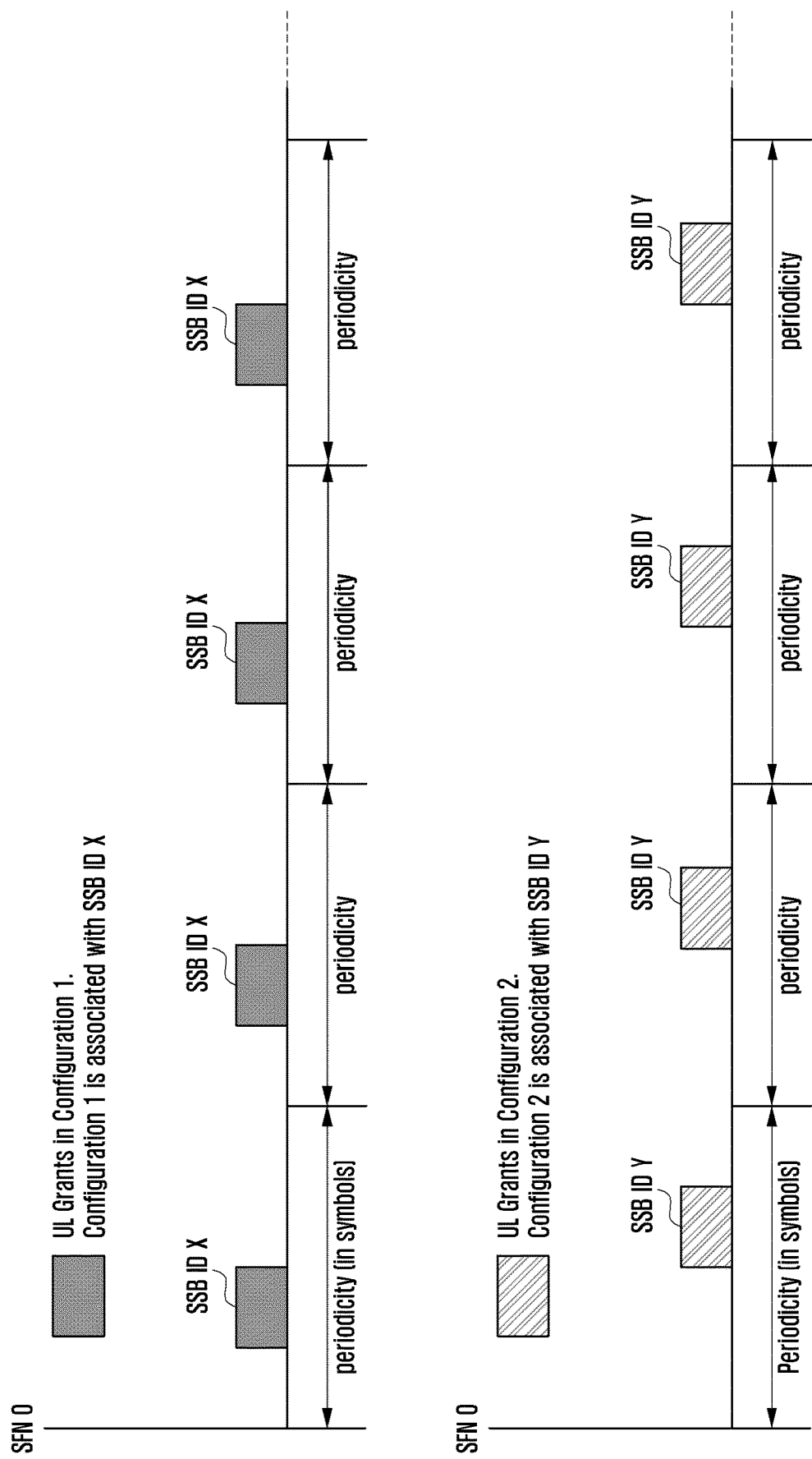
FIG. 3 illustrates another example of association between synchronization signal block and uplink grant according to an embodiment of the disclosure.

FIG. 3 illustrates another example of association between synchronization signal block and uplink grant according to an embodiment of the disclosure.

Referring to FIG. 3, each grant configuration is mapped to one SSB. So all UL grants/PUSCH occasions of that configured grant configuration are mapped to the same SSB. In case a grant configuration is mapped to multiple SSBs, SSBs can be sequentially mapped to UL grants/PUSCH occasions in sequentially manner as in FIG. 2. In case UL grants/PUSCH occasions in a grant configuration are also frequency division multiplexed, UL grants/PUSCH occasions can be sequentially first mapped in frequency and then in time.

Embodiment 2-2—Criteria to Determine Whether to Use Preconfigured PUSCH Resource for SDT or not The UE can perform SDT using preconfigured PUSCH resource (or CG resources) if following condition(s) are met. In different embodiments, a subset of below conditions can be applied.

Condition 1: the upper layers request resumption of an RRC connection and the resumption request is for mobile originating calls and the establishment cause is mo-Data; or the upper layers request resumption of an RRC connection and the resumption request is for mobile originating calls; or and the resumption request is for mobile originating calls.

Condition 2: the UE supports SDT.

Condition 3: Preconfigured PUSCH resources are signaled in RRCRelease message with suspend indication during the preceding suspend procedure and UE is in same cell from which it has received Preconfigured PUSCH resources.

Condition 4: UE has a stored value of the nextHopChainingCount provided in the RRCRelease message with suspend indication during the preceding suspend procedure. This condition can be skipped if nextHopChainingCount is always provided in RRCRelease message.

Condition 5: If the LCH restrictions for LCP are applied for SDT and all LCHs for which data is available for transmission is allowed to be multiplexed in MAC PDU for Preconfigured PUSCH resource for SDT according to LCH restrictions.

Note that the Network can also indicate the DRBs for which SDT is allowed. In this case in Condition 5, LCHs corresponding to the DRBs for which SDT is allowed is considered. If data is available for transmission for DRBs other than DRBs for which SDT is allowed, the UE shall initiate connection resume without SDT. In an embodiment Cond 5 is not used for determining SDT or not.

Condition 6: UE has a valid TA value.

The network configures SDT-TimeAlignmentTimer. The SDT-TimeAlignmentTimer is started upon receiving the SDT-TimeAlignmentTimer configuration from network. When a Timing Advance Command MAC control element is received or PDCCH indicates timing advance adjustment, the SDT-TimeAlignmentTimer is restarted.

If SDT-TimeAlignmentTimer is running; and

If the SS-RSRP (SS reference signal received power is the linear average of the power contributions of the resource elements that carry secondary synchronization signals) of pathloss reference (i.e., SSB) has not increased by more than rsrp-IncreaseThresh since the last time SDT-TimeAlignmentTimer was started; and If the SS-RSRP of the pathloss reference (i.e., SSB) has not decreased by more than rsrp-DecreaseThresh since the last time SDT-TimeAlignmentTimer was started:

TA is considered valid. The SSB whose SS-RSRP is measured for TA validation is amongst the SSBs transmitted in the camped cell or the SSB whose SS-RSRP is measured for TA validation is amongst the SSBs associated with the Preconfigured PUSCH resources or the SSB whose SS-RSRP is measured for TA validation is the SSB which is amongst the SSBs associated with the Preconfigured PUSCH resources and is also transmitted in camped cell. In case multiple such SSBs exists, SS-RSRP of best SSB (i.e. one with highest value of SS-RSRP) amongst such SSB can be used for TA validation.

Condition 7: The UE has at least one SSB with SS-RSRP above a threshold, among the SSBs associated with Preconfigured PUSCH resources for UL carrier/UL BWP selected for SDT using Preconfigured PUSCH resources. If the RSRP of the downlink pathloss reference is less than rsrp-ThresholdSSB-SUL, SUL is selected for SDT using Preconfigured PUSCH resources. Otherwise, NUL is selected for SDT using Preconfigured PUSCH resources. In an embodiment, Cond 7 is not used for determining SDT or not.

Condition 8: If the size of MAC PDU to be transmitted is less than or equal to transport block size (TBS) of Preconfigured PUSCH resource, or the size of data available is less than or equal to data volume threshold (data volume threshold is signaled by gNB). One of the following options can be used to configure TBS for SDT using Preconfigured PUSCH resource and to determine whether to Preconfigured PUSCH resource for small data transmission or normal connection resume.

Embodiment 2-2-1—Option 1: Single PUSCH Configuration (for an UL Carrier of Camped Cell) and No Signal Quality Based Threshold The gNB configures a single PUSCH configuration (for an UL carrier of camped cell) for SDT. The TBS is not explicitly signaled but determined based on SCS, number of PRBs and number of OFDM symbols of PUSCH resource. The TBS can also be explicitly signaled.

If the message size (UL data available for transmission plus MAC header and, where required, MAC control elements) is less than equal to the TB size of payload according to PUSCH configuration on UL carrier selected for transmission:

---
UE initiate small data transmission using Preconfigured PUSCH resources.
  Else
    UE does not initiate small data transmission using Preconfigured PUSCH resources. UE may initiate small data transmission using RACH if RACH based criteria to perform SDT is met.

---

Embodiment 2-2-2—Option 2: Single PUSCH Configuration (for an UL Carrier of Camped Cell) and Single RSRP Threshold The gNB configures a single PUSCH configuration (for an UL carrier of camped cell) for SDT. The TBS is not explicitly signaled but determined based on SCS, number of PRBs and number of OFDM symbols of PUSCH resource. The TBS can also be explicitly signaled. The gNB also configures the parameter sdt-Threshold. These parameters are separately configured for SUL and NUL as UL coverage is different for SUL and NUL.

If the message size (UL data available for transmission plus MAC header and, where required, MAC control elements) is less than equal to the TB size of payload according to PUSCH configuration on UL carrier selected for transmission and RSRP of the downlink pathloss reference is greater than or equal to sdt-Threshold:

---
UE initiate small data transmission using Preconfigured PUSCH resources.
  Else
    UE does not initiate small data transmission using Preconfigured PUSCH resources. UE may initiate small data transmission using RACH if RACH based criteria to perform SDT is met.

---

Embodiment 2-2-3—Option 3: Multiple [PUSCH Configuration, Threshold]

The gNB configures the parameter PUSCH-Config-SDT-1 and PUSCH-Config-SDT-2 PUSCH configuration (for an UL carrier of camped cell) for SDT. The TBS is not explicitly signaled but determined based on SCS, number of PRBs and number of OFDM symbols of PUSCH resource. The TBS can also be explicitly signaled. The sdt-Threshold-1 is also configured. These parameters are separately configured for SUL and NUL as UL coverage is different for SUL and NUL.

If the message size (UL data available for transmission plus MAC header and, where required, MAC control elements) is less than equal to the TB size of payload according to PUSCH-Config-SDT-1 for SDT on UL carrier selected for transmission:

---
UE initiate small data transmission using Preconfigured PUSCH resources in PUSCH-Config-SDT-1.
  Else if the meassage size (UL data available for transmission plus MAC header and, where required, MAC control elements) is less than equal to the TB size of payload according to PUSCH-Config-SDT-2 for the selected UL carrier and RSRP of the downlink pathloss reference is greater than or equal to sdt-Threshold-2
    The UE initiates small data transmission using Preconfigured PUSCH resources in PUSCH-Config-SDT-2.
  Else
    The UE does not initiate small data transmission using Preconfigured PUSCH resources. UE may initiate small data transmission using RACH if RACH based criteria to perform SDT is met.

---

This option can be generalized wherein gNB configures the parameters PUSCH-Config-SDT-1 to PUSCH-Config-SDT-N; sdt-Threshold-2 to sdt-Threshold-N If the message size (UL data available for transmission plus MAC header and, where required, MAC control elements) is less than equal to the TB size of payload according to PUSCH-Config-SDT-1 for SDT on UL carrier selected for transmission:
  The UE initiates small data transmission using Preconfigured PUSCH resources in PUSCH-Config-SDT-1.
Else if the message size (UL data available for transmission plus MAC header and, where required, MAC control elements) is less than equal to the TB size of payload according to PUSCH-Config-SDT-2 for the selected UL carrier and RSRP of the downlink pathloss reference is greater than or equal to sdt-Threshold-2
  The UE initiates small data transmission using Preconfigured PUSCH resources in PUSCH-Config-SDT-2.
Else if the message size (UL data available for transmission plus MAC header and, where required, MAC control elements) is greater than TB size of payload according to PUSCH-Config-SDT-2 and ('is greater than TB size of payload according to PUSCH-Config-SDT-2 and' can be removed in one embodiment) is less than equal to the TB size of payload according to PUSCH-Config-SDT-3 for SDT on UL carrier selected for transmission and RSRP of the downlink pathloss reference is greater than or equal to sdt-Threshold-3
  UE initiate small data transmission using Preconfigured PUSCH resources in PUSCH-Config-SDT-2.
Else if the message size (UL data available for transmission plus MAC header and, where required, MAC control elements) is greater than TB size of payload according to PUSCH-Config-SDT-N−1 and ('is greater than TB size of payload according to PUSCH-Config-SDT-N−1 and' can be removed in one embodiment) is less than equal to the TB size of payload according to PUSCH-Config-SDT-N for SDT on UL carrier selected for transmission and RSRP of the downlink pathloss reference is greater than or equal to sdt-Threshold-N ---
UE initiate small data transmission using Preconfigured PUSCH resources in PUSCH-Config-SDT-N.
  Else:
    UE does not initiate small data transmission using Preconfigured PUSCH resources. UE may initiate small data transmission using RACH if RACH based criteria to perform SDT is met.

---

Embodiment 2-2-3A—Option 3A

The gNB configures the parameter PUSCH-Config-SDT-1 and PUSCH-Config-SDT-2 in PUSCH configuration (for an UL carrier of camped cell) for SDT. The TBS is not explicitly signaled but determined based on SCS, number of PRBs and number of OFDM symbols of PUSCH resource. The TBS can also be explicitly signaled. sdt-Threshold-1 and sdt-Threshold-2 are also configured. These parameters are separately configured for SUL and NUL as UL coverage is different for SUL and NUL.

If the message size (UL data available for transmission plus MAC header and, where required, MAC control elements) is less than equal to the TB size of payload according to PUSCH-Config-SDT-1 for SDT on UL carrier selected for transmission and RSRP of the downlink pathloss reference is greater than or equal to sdt-Threshold-1:
  UE initiate small data transmission using Preconfigured PUSCH resources in PUSCH-Config-SDT-1.
 Else if the message size (UL data available for transmission plus MAC header and, where required, MAC control elements) is greater than TB size of payload according to PUSCH-Config-SDT-1 and ('is greater than TB size of payload according to PUSCH-Config-SDT-1 and' can be removed in one embodiment) is less than equal to the TB size of payload according to PUSCH-Config-SDT-2 for the selected UL carrier and RSRP of the downlink pathloss reference is greater than or equal to sdt-Threshold-2

---

UE initiate small data transmission using Preconfigured PUSCH resources in PUSCH-Config-SDT-2.
Else
 The UE does not initiate small data transmission using Preconfigured PUSCH resources. The UE may initiate small data transmission using RACH if RACH based criteria to perform SDT is met.

---

This option can be generalized wherein gNB configures the parameters PUSCH-Config-SDT-1 to PUSCH-Config-SDT-N; sdt-Threshold-1 to sdt-Threshold-N.

If the message size (UL data available for transmission plus MAC header and, where required, MAC control elements) is less than equal to the TB size of payload according to PUSCH-Config-SDT-1 for SDT on UL carrier selected for transmission and RSRP of the downlink pathloss reference is greater than or equal to sdt-Threshold-1:
  The UE initiates small data transmission using Preconfigured PUSCH resources in PUSCH-Config-SDT-1.
 Else if the message size (UL data available for transmission plus MAC header and, where required, MAC control elements) is greater than TB size of payload according to PUSCH-Config-SDT-1 and ('is greater than TB size of payload according to PUSCH-Config-SDT-1 and' can be removed in one embodiment) is less than equal to the TB size of payload according to PUSCH-Config-SDT-2 for the selected UL carrier and RSRP of the downlink pathloss reference is greater than or equal to sdt-Threshold-2
  The UE initiates small data transmission using Preconfigured PUSCH resources in PUSCH-Config-SDT-2.
 Else if the message size (UL data available for transmission plus MAC header and, where required, MAC control elements) is greater than TB size of payload according to PUSCH-Config-SDT-N−1 and ('is greater than TB size of payload according to PUSCH-Config-SDT-N−1 and' can be removed in one embodiment) is less than equal to the TB size of payload according to PUSCH-Config-SDT-N for SDT on UL carrier selected for transmission and RSRP of the downlink pathloss reference is greater than or equal to sdt-Threshold-N

---

The UE initiates small data transmission using Preconfigured PUSCH resources in PUSCH-Config-SDT-N.
Else:
 UE does not initiate small data transmission using Preconfigured PUSCH resources. UE may initiate small data transmission using RACH if RACH based criteria to perform SDT is met.

---

Embodiment 2-2-4—Option 4: Multiple [TBS]

The gNB configures the parameter PUSCH-Config-SDT-1 and PUSCH-Config-SDT-2 in PUSCH configuration (for an UL carrier of camped cell) for SDT. The TBS is not explicitly signaled but determined based on SCS, number of PRBs and number of OFDM symbols of PUSCH resource. The TBSs can also be explicitly signaled. These parameters are separately configured for SUL and NUL as UL coverage is different for SUL and NUL.

If the message size (UL data available for transmission plus MAC header and, where required, MAC control elements) is less than equal to the TB size of payload according to PUSCH-Config-SDT-1:
  The UE initiates small data transmission using Preconfigured PUSCH resources in PUSCH-Config-SDT-1.
 Else if the message size (UL data available for transmission plus MAC header and, where required, MAC control elements) is less than equal to the TB size payload according to PUSCH-Config-SDT-2:

---

The UE initiates small data transmission using Preconfigured PUSCH resources in PUSCH-Config-SDT-2.
Else
 The UE does not initiate small data transmission using Preconfigured PUSCH resources. The UE may initiate small data transmission using RACH if RACH based criteria to perform SDT is met.

---

This option can be generalized wherein gNB configures the parameters PUSCH-Config-SDT-1 and PUSCH-Config-SDT-N.

If the message size (UL data available for transmission plus MAC header and, where required, MAC control elements) is less than equal to the TB size of payload according to PUSCH-Config-SDT-1:
  The UE initiates small data transmission using Preconfigured PUSCH resources in PUSCH-Config-SDT-1.
 Else if the message size (UL data available for transmission plus MAC header and, where required, MAC control elements) is less than equal to the TB size of payload according to PUSCH-Config-SDT-2:
  The UE initiates small data transmission using Preconfigured PUSCH resources in PUSCH-Config-SDT-2.
 Else if the message size (UL data available for transmission plus MAC header and, where required, MAC control elements) is less than equal to the TB size of payload according to PUSCH-Config-SDT-3:
  The UE initiates small data transmission using Preconfigured PUSCH resources in PUSCH-Config-SDT-3.
 Else if the message size (UL data available for transmission plus MAC header and, where required, MAC control elements) is less than equal to the TB size of payload according to PUSCH-Config-SDT-N:

```
The UE initiates small data transmission using Preconfigured
PUSCH resources in PUSCH-Config-SDT-N.
Else:
    The UE does not initiate small data transmission using
Preconfigured PUSCH resources. The UE may initiate small data
transmission using RACH if RACH based criteria to perform SDT is met.
```

Embodiment 2-3—PDCCH Monitoring Upon Transmission Small Data in Preconfigured PUSCH Resource Upon transmitting uplink data in preconfigured PUSCH resource, UE needs to monitor PDCCH for network response.

Search Space: The UE needs to know search space for monitoring PDCCH. One of the following options can be used for determining a search space for monitoring PDCCH for network response for SDT using preconfigured PUSCH resource.

Option 1: sdt-SearchSpaceCG for SDT using preconfigured PUSCH resource can be signaled by network in RRCRelease message along with Preconfigured PUSCH resources.
    1-1: sdt-SearchSpaceCG indicates one of the search space in PDCCH-ConfigCommon IE of initial DL BWP or DL BWP with same BWP ID as the UL BWP selected for SDT using preconfigured PUSCH resource.
    1-2: sdt-SearchSpaceCG indicates one of the search space in PDCCH-Config IE of initial DL BWP or DL BWP with same BWP ID as the UL BWP selected for SDT using preconfigured PUSCH resource.
  Option 2: sdt-SearchSpaceCG can be signaled by network in initial DL BWP configuration (PDCCH-ConfigCommon IE or PDCCH-Config IE) or DL BWP configuration with same BWP ID as the UL BWP selected for SDT using preconfigured PUSCH resource.
  sdt-SearchSpaceCG indicates the search space id of the search space configuration (amongst the list of search space configuration) to be used for PDCCH monitoring.
  The UE monitors the search space using the RX beam corresponding to SSB associated with UL grant in which transmission is made by UE.

RNTI: The UE needs to know the RNTI for monitoring PDCCH. UE can monitor PDCCH addressed to C-RNTI where the C-RNTI is the one which the UE used in cell from which it received preconfigured PUSCH resources. Alternately, the C-RNTI can be assigned along with preconfigured PUSCH resources (e.g. in RRCRelease message).

Monitoring Time: The UE needs to know the time interval for monitoring response. A timer can be configured by network along with preconfigured PUSCH resources. The timer can be started from end of PUSCH transmission or at the first PDCCH monitoring occasion from the end of PUSCH transmission or at a fixed offset from the end of PUSCH transmission. If the UE receives PDCCH addressed to C-RNTI and TB is successfully decoded, the timer is stopped.

Retransmission Handling:
  Option 1: No retransmissions. If the timer expires, SDT is considered to have failed.
  Option 2: Timer based retransmissions: The UE retransmits the generated MAC PDU using preconfigured PUSCH resource if it has not yet transmitted the MAC PDU configurable number of times. If UE has transmitted the MAC PDU the configurable number of times, SDT is considered to have failed.
    During retransmission, the UE first selects SSB (in an embodiment, UE uses the same SSB as was selected during the first transmission); UE then selects PUSCH resource corresponding to the selected SSB; the UE then transmits in selected PUSCH resource; the UE starts the monitoring timer and waits for response (i.e., PDCCH addressed to C-RNTI). If UCI is supported, the UE may indicate new transmission/retransmission in the UCI. Redundancy Version (RV) may be pre-defined for each transmission/retransmission.
    During retransmission, power ramping may be performed for PUSCH transmission. The power of the previous transmission may be ramped by a power ramping step. The power ramping step is signaled by the gNB.
  Option 3: Network triggered retransmissions:
    The UE performs HARQ retransmission if the UE receives PDCCH addressed to C-RNTI for HARQ retransmission of HARQ process used for SDT using preconfigured PUSCH resource. PDCCH indicates UL grant for retransmission. HARQ process used for SDT using preconfigured PUSCH resource can be signaled in SDT configuration or can be pre-defined.
    The UE re-starts the monitoring timer and waits for response.
    The UE continues to use the SSB selected during initial transmission.
    During retransmission, power ramping can be performed for PUSCH transmission. The power of the previous transmission may be ramped by a power ramping step. The power ramping step is signaled by gNB.

In the response to the small data transmission, UE may receive a signal (RRC message or DCI) for the following purpose:
releasing pre-configured PUSCH or switching to Resume procedure (i.e. RRC_CONNECTED).

Embodiment 2-4—Release of Preconfigured PUSCH Resource

Option 1: Timer based Release
Timer is (re-) started upon receiving preconfigured PUSCH resource in release message. Upon expiration of the timer, preconfigured PUSCH resources are released.
Option 2: Release upon number of occurrences
  The MAC entity shall discard the immediately Preconfigured PUSCH resource after 'N' number of consecutive association periods in which grant was not used. Association period is equal to periodicity of configured grant*X where X is number of SSBs associated with configured grant.
Option 3: Reception of RRCRelease without any Preconfigured PUSCH resource or any indication to use the previously configured resources
Option 4: Release upon cell change
Option 5: Release upon connection resume
Option 6: gNB may want to release the pre-configured PUSCH for Inactive UE. Then RAN paging can be used.

New field in RAN paging can be introduced. If UE receives RAN paging with the new field, UE releases pre-configured PUSCH, but need not switch to RRC_CONNECTED.

Embodiment 2-5—Signaling Flow without Context Fetch

Figure 4:
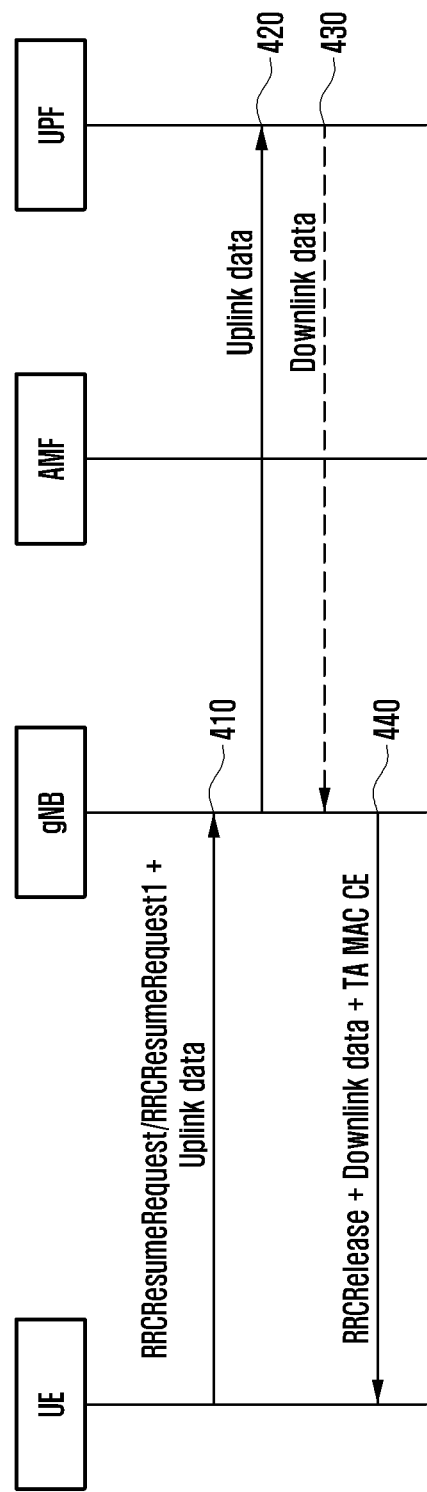
FIG. 4 illustrates a flow chart for small data transmission using preconfigured uplink resource according to an embodiment of the disclosure.

FIG. 4 illustrates a flow chart for small data transmission using preconfigured uplink resource according to an embodiment of the disclosure.

Referring to FIG. 4, in this case it is assumed the gNB has the UE's context.

0. Criteria to initiate SDT using preconfigured PUSCH resources is met.

1. In the preconfigured PUSCH resource, the UE sends an RRCResumeRequest/RRCResumeRequest1 to the gNB (same as the last serving GNB) on SRB 0 in operation 410. The request includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, UE shall calculate it using the integrity algorithm (NIA or EIA) in the stored AS security context, which was negotiated between the UE and the last serving gNB and the KRRCint from the stored AS security context with the following inputs:
  KEY: shall be set to current KRRCint;
  BEARER: all bits shall be set to 1.
  DIRECTION: shall be set to 1;
  COUNT: all bits shall be set to 1;
  MESSAGE: shall be set to VarResumeMAC-Input with following inputs:
    source PCI (set to the physical cell identity of the PCell the UE was connected to prior to suspension of the RRC connection)
    target Cell-ID (set to the cellIdentity of the first PLMN-Identity included in the PLMN-IdentityInfoList broadcasted in SIB1 of the target cell i.e. the cell to which the UE is sending small data)
    source C-RNTI (set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection, and re-establishes the AS security. The user data are ciphered and integrity protected (only for DRBs configured with UP integrity protection) and transmitted on DTCH multiplexed with the RRCResumeRequest/RRCResumeRequest1 message on CCCH.

Alternately, the UE can transmit small data by using one of the following options:
  RRCResumeRequest (or new RRC message). resumeIdentity, ResumeMAC-I, resumeCause, NAS container in RRCResumeRequest/RRCResumeRequest1. NAS container includes UL data.
  new MAC CE (resumeIdentity, ResumeMAC-I)+uplink data (on DTCH). resumeIdentity is provided for UE identification purpose. ResumeMAC-I is for security.

2. The gNB validates the resumeMAC-I and delivers the uplink data to the UPF in operation 420.

3. The gNB sends the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with pre-configured PUSCH resources. If downlink data is available in operation 430, the downlink data are sent ciphered and integrity protected (only for DRBs configured with UP integrity protection) on DTCH multiplexed with the RRCRelease message on DCCH in operation 440.

(Alternate 1) Consider an alternate signaling flow wherein gNB can schedule UL grant (PDCCH addressed to C-RNTI) before RRCRelease. In the UL transmission, the UE can indicate if the UE has more data to transmit. If the UE has more data to transmit, the gNB can schedule UL grant. Otherwise RRCRelease. In the UL transmission, the UE can also include SSB ID(s) of SSB above threshold if the SSB indicated by PRACH preamble is no longer suitable.

(Alternate 2) Alternately, the gNB can transmit PDCCH addressed to RNTI (i.e. RNTI is the one assigned by gNB along with preconfigured resource, the RNTI can be assigned to other UEs as well) and scheduled DL TB includes contention resolution identity (it is first X bits (e.g. 48 bits) of resume message) and C-RNTI. If it matches with UE's contention resolution identity, UE stops the monitoring timer and UE can consider small data transmission as successful.

In the response of the small data transmission, UE can receive a signal (RRC message or DCI) for the following purpose:
  releasing pre-configured PUSCH or switching to Resume procedure (i.e. RRC_CONNECTED).

Embodiment 2-6—an Example Signaling Flow with Context Fetch and Path Switching

Figure 5:
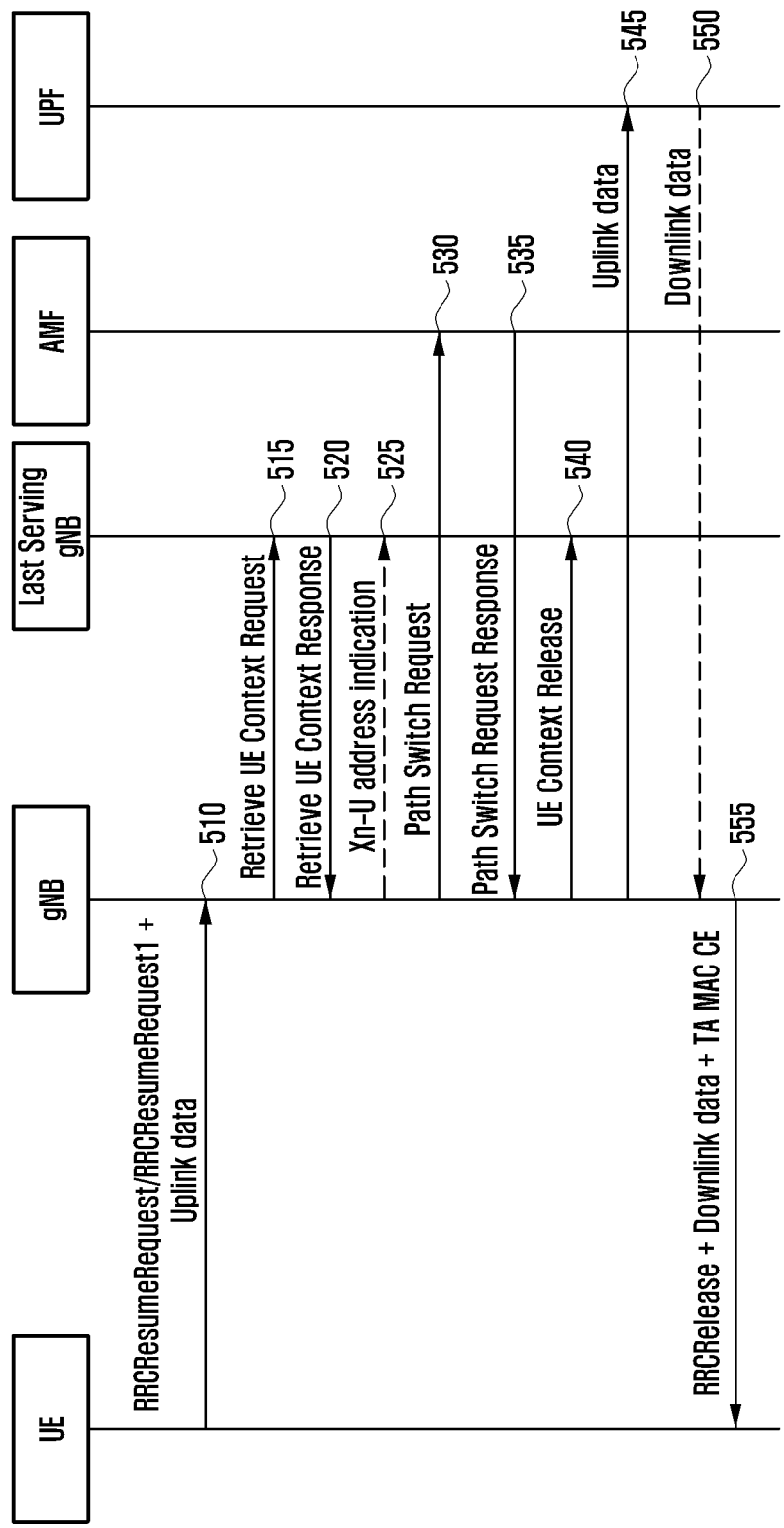
FIG. 5 illustrates a flow chart for small data transmission using preconfigured uplink resource according to an embodiment of the disclosure.

FIG. 5 illustrates a flow chart for small data transmission using preconfigured uplink resource according to embodiment of the disclosure.

Referring to FIG. 5, in this case it is assumed the gNB does not have the UE's context and fetches the same from last serving gNB. Path switch is performed and context is released from last serving gNB. This can occur only when the UE is transmitting using pre-configured PUSCH resource in a cell other than the cell from which UE has last received RRC release message.

0. Criteria to initiate SDT using preconfigured PUSCH resources is met.

1. In the preconfigured PUSCH resource, UE sends an RRCResumeRequest/RRCResumeRequest1 to the gNB (different from last serving gNB) on SRB 0 in operation 510. The request includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate the ResumeMAC-I using the integrity algorithm (NIA or EIA) in the stored AS security context, which was negotiated between the UE and the last serving gNB and the KRRCint from the stored AS security context with the following inputs:
  KEY: shall be set to current KRRCint;
  BEARER: all bits shall be set to 1.
  DIRECTION: shall be set to 1;
  COUNT: all bits shall be set to 1;
  MESSAGE: shall be set to VarResumeMAC-Input with following inputs:

source PCI (set to the physical cell identity of the PCell the UE was connected to prior to suspension of the RRC connection).

target Cell-ID (Set to the cellIdentity of the first PLMN-Identity included in the PLMN-IdentityInfoList broadcasted in SIB1 of the target cell i.e. the cell the UE is trying to resume).

source C-RNTI (Set to C-RNTI that the UE had in the PCell it was connected to prior to suspension of the RRC connection).

The UE resumes all SRBs and DRBs, derives new security keys using the NextHopChainingCount provided in the RRCConnectionRelease message of the previous RRC connection, and re-establishes the AS security. The user data are ciphered and integrity protected (Only for DRBs configured with UP integrity protection) and transmitted on DTCH multiplexed with the RRCResumeRequest/RRCResumeRequest1 message on CCCH.

2. The gNB (i.e., target GNB) identifies the GNB identity of last serving gNB (i.e., source gNB) from I-RNTI and requests the last serving gNB to provide the UE's context data by sending an Retrieve UE Context Request message with the following included: I-RNTI, the ResumeMAC-I and target Cell-ID, in order to allow the source gNB to validate the UE request and to retrieve the UE context in operation 515.

3. The last serving gNB (i.e., source gNB) validates the resumeMAC-I and provides the UE context data.

The source gNB retrieves the stored UE context including the UE 5G AS security context from a database using the I-RNTI. The source gNB verifies the ResumeMAC-I using the current $K_{RRCint}$ key stored in the retrieved UE 5G AS security context (calculating the ResumeMAC-I in the same way as described above). If the verification of the ResumeMAC-I is successful, then the source gNB calculates $K_{NG\text{-}RAN}^*$ using the target cell PCI, target ARFCN-DL and the KgNB/NH in the current UE 5G AS security context based on either a horizontal key derivation or a vertical key derivation according to whether the source gNB has an unused pair of {NCC, NH}. The source gNB can obtain the target PCI and target ARFCN-DL from a cell configuration database by means of the target Cell-ID which was received from the target gNB. Then the source gNB shall respond with an Xn-AP Retrieve UE Context Response message to the target gNB including the UE context that contains the UE 5G AS security context in operation 520. The UE 5G AS security context sent to the target gNB shall include the newly derived $K_{NG\text{-}RAN}^*$, the NCC associated to the $K_{NG\text{-}RAN}^*$, the UE 5G security capabilities, UP security policy, the UP security activation status with the corresponding PDU session ID(s), and the ciphering and integrity algorithms used by the UE with the source cell.

4. If loss of DL user data buffered in the last serving gNB shall be prevented, the gNB provides forwarding addresses in operation 525.

5. The gNB performs path switch in operations 530 and 535.

6. The gNB triggers the release of the UE resources at the last serving gNB in operation 540.

7. The gNB delivers the uplink data to UPF in operation 545.

8. The gNB sends the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with pre-configured PUSCH resources. If downlink data is available in operation 550, the downlink data are sent ciphered and integrity protected (only for DRBs configured with UP integrity protection) on DTCH multiplexed with the RRCRelease message on DCCH in operation 555.

(Alternate 1) We can consider an alternate signaling flow wherein gNB can schedule UL grant (PDCCH addressed to C-RNTI) before RRCRelease. In the UL transmission UE can indicate if it has more data to transmit. If UE has more data to transmit, gNB can schedule UL grant. Otherwise RRCRelease. In the UL transmission, UE can also include SSB ID(s) of SSB above threshold if the SSB indicated by PRACH preamble is no longer suitable.

(Alternate 2) Alternately gNB can transmit PDCCH addressed to RNTI (i.e. RNTI is the one assigned by gNB along with preconfigured resource, it can be assigned to other UEs as well) and scheduled DL TB includes contention resolution identity (it is first X bits (e.g. 48 bits) of resume message) and C-RNTI. If it matches with UE's contention resolution identity, UE stops the monitoring timer and UE can consider small data transmission as successful.

In the response of the small data transmission, UE can receive a signal (RRC message or DCI) for the following purpose:

releasing pre-configured PUSCH or switching to Resume procedure (i.e. RRC_CONNECTED).

Embodiment 2-7—MAC PDU Generation for SDT

In one method of this disclosure, for small data transmission in RRC_INACTIVE using MsgA or Msg3 or preconfigured PUSCH resource, none of the LCH restrictions are applied while generating MAC PDU.

Figure 6:
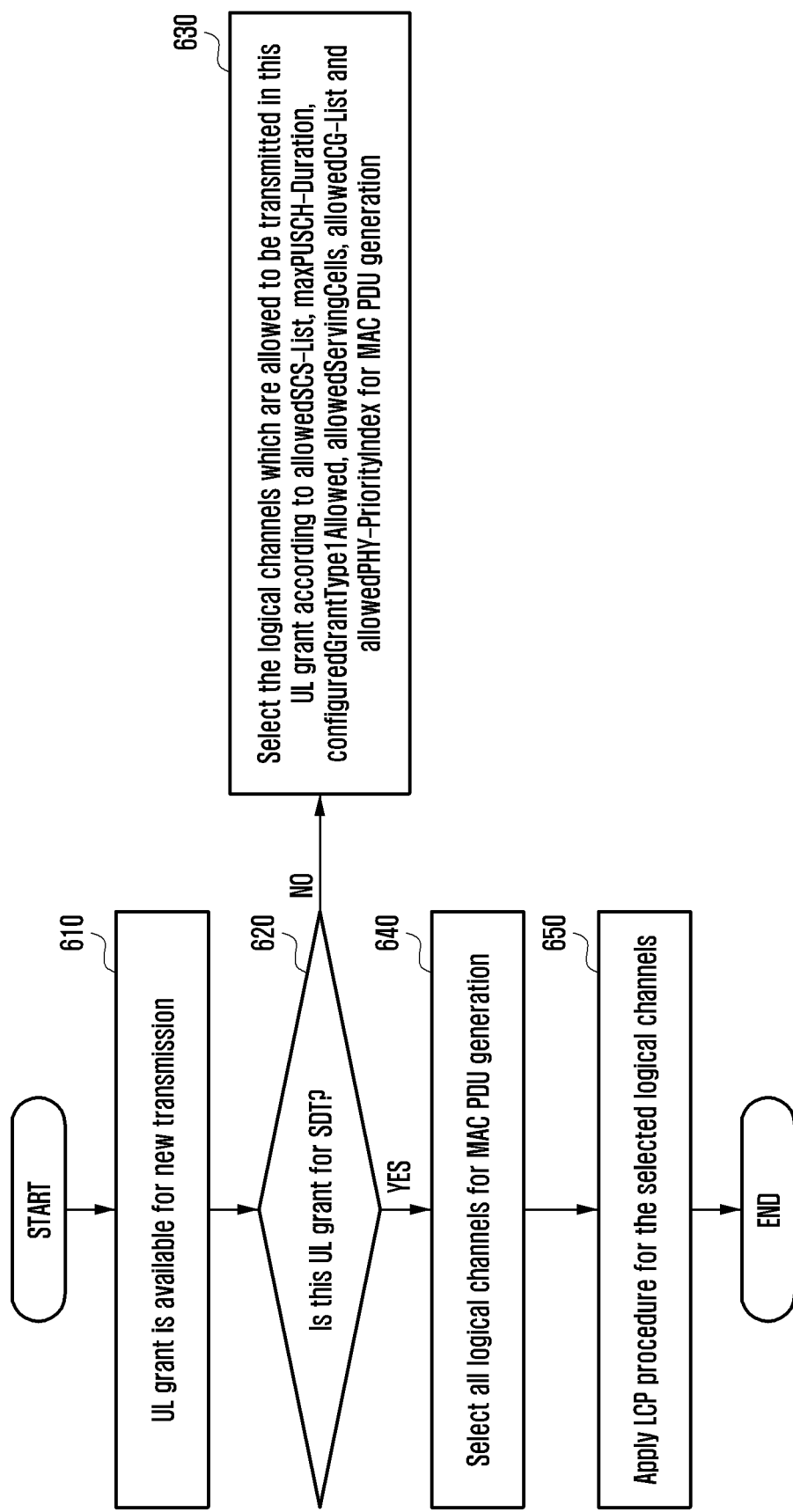
FIG. 6 illustrates a flow chart for generating medium access control (MAC) protocol data unit (PDU) for small data according to an embodiment of the disclosure.

FIG. 6 illustrates a flow chart for generating medium access control (MAC) protocol data unit (PDU) for small data transmission according to an embodiment of the disclosure.

Referring to FIG. 6, if UL grant is available for new transmission at operation 610, whether this UL grant is for SDT is determined at operation 620. If the UL grant is for SDT, the UE selects all logical channels (i.e., logical channels corresponding to RBs which are resumed upon initiating small data transmission procedure) for MAC PDU generation at operation 640, and applies LCP procedure for the selected logical channels at operation 650. Otherwise, the UE selects the logical channels (among the logical channels corresponding to RBs which are resumed upon initiating small data transmission procedure) which are allowed to be transmitted in this UL grant according to at least one of allowedSCS-List, maxPUSCH-Duration, configuredGrantType1Allowed, allowedServingCells, allowedCG-List or allowedPHY-PriorityIndex for MAC PDU generation at operation 630.

Figure 7:
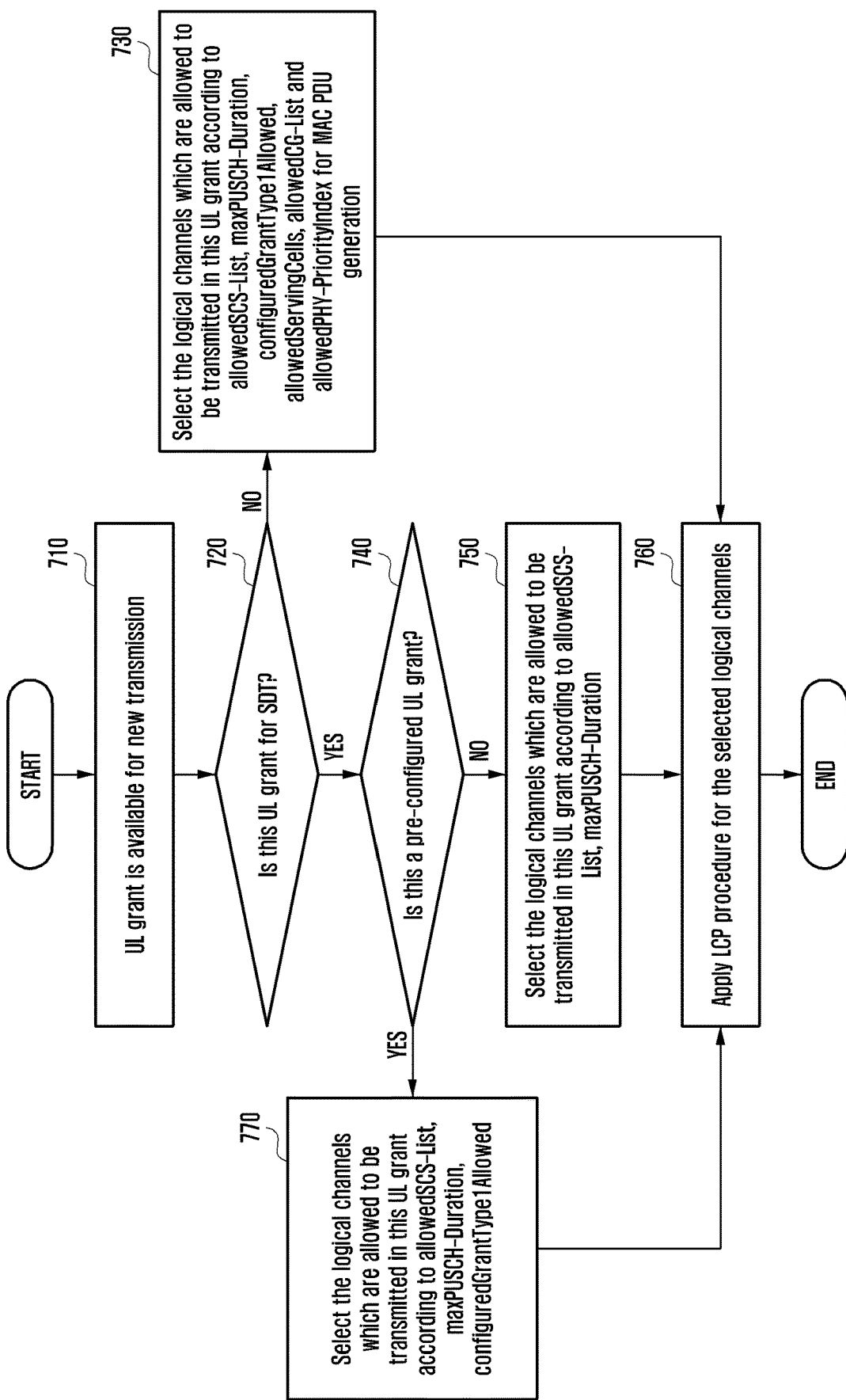
FIG. 7 illustrates a flow chart for generating MAC PDU for small data transmission according to an embodiment of the disclosure.

FIG. 7 illustrates a flow chart for generating MAC PDU for small data transmission according to an embodiment of the disclosure.

Referring to FIG. 7, allowedSCS-List and maxPUSCH-Duration are applied for generating MAC PDU for SDT. This means that if LCH is configured with allowedSCS-List and SCS included in allowedSCS-List is not the SCS of UL grant used for SDT, this LCH is not selected for SDT. This means that if LCH is configured with maxPUSCH-Duration and duration included in allowedSCS-List is not the duration of UL grant used for SDT, this LCH is not selected for SDT. AllowedServingCells is not applied for generating MAC PDU for SDT. ConfiguredGrantType1Allowed is not applied for RACH based small data transmission but allowed for non RACH based small data transmission. For non RACH based small data transmission, if LCH is not configured with configuredGrantType1Allowed, this LCH is not selected for SDT.

Specifically, if UL grant is available for new transmission at operation 710, whether this UL grant is for SDT is determined at operation 720. If the UL grant is not for SDT, the UE selects the logical channels which are allowed to be transmitted in this UL grant according to allowedSCS-List, maxPUSCH-Duration, configuredGrantType1Allowed, allowedServingCells, allowedCG-List and allowedPHY-PriorityIndex for MAC PDU generation at operation 730. Otherwise, the UE determines whether the UL grant is a pre-configured UL grant or not at operation 740. If the UL grant is a pre-configured UL grant, the UE selects the logical channels (amongst the logical channels corresponding to RBs which are resumed upon initiating small data transmission procedure) which are allowed to be transmitted in this UL grant according to allowedSCS-List, maxPUSCH-Duration, configuredGrantType1Allowed at operation 770, and applies LCP procedure for the selected logical channels at operation 760. If the UL grant is not a pre-configured UL grant, the UE selects the logical channels (amongst the logical channels corresponding to RBs which are resumed upon initiating small data transmission procedure) which are allowed to be transmitted in this UL grant according to allowedSCS-List, maxPUSCH-Duration at operation 750, and applies LCP procedure for the selected logical channels at operation 760.

In one method of this disclosure, the network indicates whether to apply LCH restrictions or not. Indication can be in RRCRelease or RACH configuration for SDT. If network indicates to apply LCH restrictions, all LCH restrictions are considered while selecting LCH for SDT. In an embodiment, restrictions that can be applied may also be indicated from the network. In this case, UE only applies the indicated LCH restrictions while selecting LCH for SDT.

Figure 8:
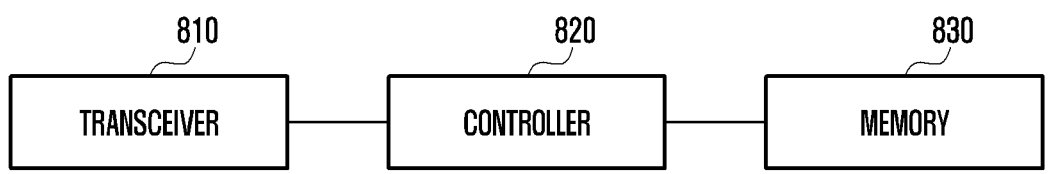
FIG. 8 is a block diagram of a terminal according to an embodiment of the disclosure.

FIG. 8 is a block diagram of a terminal according to an embodiment of the disclosure.

Referring to FIG. 8, a terminal includes a transceiver 810, a controller 820 and a memory 830. The controller 820 may refer to a circuitry, an application-specific integrated circuit (ASIC), or at least one processor. The transceiver 810, the controller 820 and the memory 830 are configured to perform the operations of the terminal illustrated in the FIGS. 1 to 7, or described above. Although the transceiver 810, the controller 820 and the memory 830 are shown as separate entities, they may be realized as a single entity like a single chip. Or, the transceiver 810, the controller 820 and the memory 830 may be electrically connected to or coupled with each other.

The transceiver 810 may transmit and receive signals to and from other network entities, e.g., a base station.

The controller 820 may control the terminal to perform functions according to one of the embodiments described above. For example, the controller 820 controls the transceiver 810 and/or memory 830 to perform small data transmission and reception according to various embodiments of the disclosure.

In an embodiment, the operations of the terminal may be implemented using the memory 830 storing corresponding program codes. The terminal may be equipped with the memory 830 to store program codes implementing desired operations. To perform the desired operations, the controller 820 may read and execute the program codes stored in the memory 830 by using at least one processor or a CPU.

Figure 9:
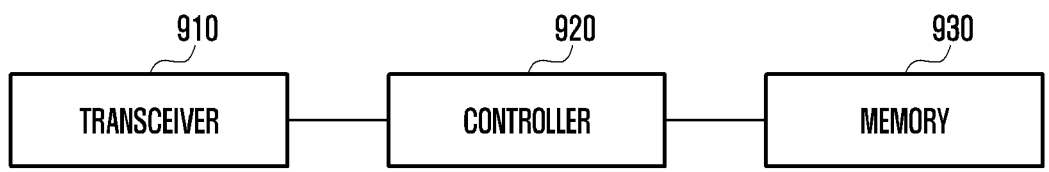
FIG. 9 is a block diagram of a base station according to an embodiment of the disclosure.

FIG. 9 is a block diagram of a base station according to an embodiment of the disclosure.

Referring to FIG. 9, a base station includes a transceiver 910, a controller 920 and a memory 930. The controller 920 may refer to circuitry, an ASIC, or at least one processor. The transceiver 910, the controller 920 and the memory 930 are configured to perform the operations of the UE illustrated in FIGS. 1 to 7, or as described above. Although the transceiver 910, the controller 920 and the memory 930 are shown as separate entities, they may be realized as a single entity like a single chip. The transceiver 910, the controller 920 and the memory 930 may be electrically connected to or coupled with each other.

The transceiver 910 may transmit and receive signals to and from other network entities, e.g., a terminal.

The controller 920 may control the base station to perform functions according to one of the embodiments described above. For example, the controller 920 controls the transceiver 910 and/or memory 930 to perform small data transmission and reception according to various embodiments of the disclosure.

In an embodiment, the operations of the base station may be implemented using the memory 930 storing corresponding program codes. The base station may be equipped with the memory 930 to store program codes implementing desired operations. To perform the desired operations, the controller 920 may read and execute the program codes stored in the memory 930 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) release message including information on at least one configured uplink resource for a small data transmission (SDT);
   identifying an uplink carrier among a normal uplink (NUL) or a supplementary uplink (SUL) for the SDT while the terminal is in an RRC inactive state;
   identifying a synchronization signal block (SSB) among SSBs associated with configured uplink resources for the SDT on the identified uplink carrier; and
   transmitting, to the base station, uplink data based on a configured uplink resource associated with the identified SSB.

2. The method of claim 1, wherein the at least one configured uplink resource for the SDT includes a first configured uplink resource for the NUL and a second configured uplink resource for the SUL.

3. The method of claim 1, further comprising:
   receiving, from the base station, information on a physical downlink control channel (PDCCH) configuration of an initial downlink bandwidth part (BWP), the information on the PDCCH configuration including information on an SDT search space for monitoring PDCCH for a response to the uplink data, wherein the RRC release message further includes information on a radio network temporary identifier (RNTI) for the SDT.

4. The method of claim 1,
wherein the uplink carrier is identified based on a first reference signal received power (RSRP) threshold configured in random access channel (RACH) configuration information, and wherein the RACH configuration information is received from the base station.

5. The method of claim 1,
wherein the SSB is identified based on a second reference signal received power (RSRP) threshold associated with SSB for the SDT configured from the base station.

6. A method performed by a base station in a wireless communication system, the method comprising:

transmitting, to a terminal, a radio resource control (RRC) release message including information on at least one configured uplink resource for a small data transmission (SDT); and receiving, from the terminal, uplink data based on a configured uplink resource associated with a synchronization signal block (SSB) on an uplink carrier for the SDT, while the terminal is in an RRC inactive state, wherein the SSB is one among SSBs associated with configured uplink resources for the SDT on the uplink carrier, and wherein the uplink carrier is one among a normal uplink (NUL) or a supplementary uplink (SUL).

7. The method of claim 6, wherein the at least one configured uplink resource for the SDT includes a first configured uplink resource for the NUL and a second configured uplink resource for the SUL.

8. The method of claim 6, further comprising:
transmitting, to the terminal, information on a physical downlink control channel (PDCCH) configuration of an initial downlink bandwidth part (BWP), the information on the PDCCH configuration including information on an SDT search space for monitoring PDCCH for a response to the uplink data, wherein the RRC release message further includes information on a cell radio network temporary identifier (RNTI) for the SDT.

9. The method of claim 6, wherein information on a first reference signal received power (RSRP) associated with SUL for the SDT is transmitted to the terminal by random access channel (RACH) configuration information for identifying the uplink carrier.

10. The method of claim 6, wherein information on a second reference signal received power (RSRP) associated with SSB for the SDT is transmitted to the terminal for identifying the SSB.

11. A terminal in a wireless communication system, the terminal comprising:
a transceiver; and
a controller configured to:
receive, from a base station via the transceiver, a radio resource control (RRC) release message including information on at least one configured uplink resource for a small data transmission (SDT),
identify an uplink carrier among a normal uplink (NUL) or supplementary uplink (SUL) for the SDT while the terminal is in an RRC inactive state, identify a synchronization signal block (SSB) among SSBs associated with configured uplink resources for the SDT on the identified uplink carrier, and transmit, to the base station via the transceiver, uplink data based on a configured uplink resource associated with the identified SSB.

12. The terminal of claim 11, wherein the at least one configured uplink resource for the SDT includes a first configured uplink resource for the NUL and a second configured uplink resource for the SUL.

13. The terminal of claim 11,
wherein the controller is further configured to receive, from the base station via the transceiver, information on a physical downlink control channel (PDCCH) configuration of an initial downlink bandwidth part (BWP), the information on the PDCCH configuration including information on an SDT search space for monitoring PDCCH for a response to the uplink data, and wherein the RRC release message further includes information on a radio network temporary identifier (RNTI) for the SDT.

14. The terminal of claim 11, wherein the uplink carrier is identified based on a first reference signal received power (RSRP) threshold configured in random access channel (RACH) configuration information, and the RACH configuration information is received from the base station.

15. The terminal of claim 11,
wherein the SSB is identified based on a second reference signal received power (RSRP) threshold associated with SSB for the SDT configured from the base station.

16. A base station in a wireless communication system, the base station comprising:
a transceiver; and
a controller configured to:
transmit, to a terminal via the transceiver, a radio resource control (RRC) release message including information on at least one configured uplink resource for a small data transmission (SDT), and
receive, from the terminal via the transceiver, uplink data based on a configured uplink resource associated with a synchronization signal block (SSB) on an uplink carrier for the SDT, while the terminal is in an RRC inactive state, wherein the SSB is one among SSBs associated with configured uplink resources for the SDT on the uplink carrier, and wherein the uplink carrier is one among a normal uplink (NUL) or a supplementary uplink (SUL).

17. The base station of claim 16, wherein the at least one configured uplink resource for the SDT includes a first configured uplink resource for the NUL and a second configured uplink resource for the SUL.

18. The base station of claim 16,
wherein the controller is further configured to transmit, to the terminal via the transceiver, information on a physical downlink control channel (PDCCH) configuration of an initial downlink bandwidth part (BWP), the information on the PDCCH configuration including information on an SDT search space for monitoring PDCCH for a response to the uplink data, and wherein the RRC release message further includes information on a radio network temporary identifier (RNTI) for the SDT.

19. The base station of claim 16, wherein information on a first reference signal received power (RSRP) associated with SUL for the SDT is transmitted to the terminal by random access channel (RACH) configuration information for identifying the uplink carrier.

20. The base station of claim 16, wherein information on a second reference signal received power (RSRP) associated with SSB for the SDT is transmitted to the terminal for identifying the SSB.

* * * * *